(12) United States Patent
Nakae et al.

(10) Patent No.: US 11,524,224 B2
(45) Date of Patent: Dec. 13, 2022

(54) OPERATING DEVICE

(71) Applicant: Sony Interactive Entertainment Inc., Tokyo (JP)

(72) Inventors: Masatoshi Nakae, Tokyo (JP); Yoshiyuki Imada, Chiba (JP); Takuro Sawada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 3 days.

(21) Appl. No.: 17/090,130

(22) Filed: Nov. 5, 2020

(65) Prior Publication Data

US 2021/0146236 A1  May 20, 2021

(30) Foreign Application Priority Data

Nov. 19, 2019  (JP) .............................. JP2019-209139

(51) Int. Cl.
*A63F 13/218* (2014.01)
*A63F 13/24* (2014.01)
(Continued)

(52) U.S. Cl.
CPC ............ *A63F 13/218* (2014.09); *A63F 13/22* (2014.09); *A63F 13/24* (2014.09); *A63F 13/285* (2014.09);
(Continued)

(58) Field of Classification Search
CPC ...... A63F 13/218; A63F 13/285; A63F 13/22; G06F 3/016; G06F 2203/015
See application file for complete search history.

(56) References Cited

U.S. PATENT DOCUMENTS 6,071,194 A * 6/2000 Sanderson .............. A63F 13/06
  463/37
6,343,991 B1 * 2/2002 Armstrong .............. A63F 13/06
  463/37
(Continued)

FOREIGN PATENT DOCUMENTS

EP   3231491 A1   10/2017
EP   3493029 A1   6/2019
(Continued)

OTHER PUBLICATIONS

European Search Report for corresponding EP Application No. 20206184.2, 7 pages, dated Apr. 8, 2021.
(Continued)

*Primary Examiner* — Thomas J Hong
*Assistant Examiner* — Carl V Larsen
(74) *Attorney, Agent, or Firm* — Matthew B. Dernier, Esq.

(57) ABSTRACT

Disclosed herein is an operating device connected to an information processing device, the operating device including an information transmitting section configured to receive an operation of a user and transmit operation information indicating content of the operation to the information processing device and a control processing section configured to perform control processing determined in advance according to the operation of the user, the information transmitting section transmitting state information indicating an execution state of the control processing to the information processing device.

8 Claims, 7 Drawing Sheets

(51) Int. Cl.
 *A63F 13/285* (2014.01)
 *G06F 3/01* (2006.01)
 *A63F 13/22* (2014.01)

(52) U.S. Cl.
 CPC ........ *G06F 3/016* (2013.01); *G06F 2203/015* (2013.01)

(56) References Cited

U.S. PATENT DOCUMENTS

| | | | |
|---|---|---|---|
| 7,671,846 B1* | 3/2010 | Komata | G06F 3/0346 345/173 |
| 10,983,490 B2 | 4/2021 | Kei | |
| 2002/0025853 A1* | 2/2002 | Kojima | A63F 13/814 463/42 |
| 2009/0069081 A1* | 3/2009 | Thorner | A63F 13/285 463/30 |
| 2009/0122006 A1 | 5/2009 | Torben | |
| 2012/0019448 A1* | 1/2012 | Pitkanen | G06F 3/041 345/173 |
| 2013/0229339 A1* | 9/2013 | Takahata | G06F 3/016 345/156 |
| 2016/0317925 A1* | 11/2016 | Miller | A63F 13/98 |
| 2017/0300022 A1 | 10/2017 | Kei | |
| 2018/0345134 A1* | 12/2018 | Schmitz | G06F 3/016 |
| 2019/0224565 A1 | 7/2019 | Ikuo | |
| 2019/0308097 A1 | 10/2019 | Ikuo | |
| 2020/0353349 A1* | 11/2020 | Palmer | A63F 13/24 |

FOREIGN PATENT DOCUMENTS

| | | |
|---|---|---|
| JP | 2017189368 A | 10/2017 |
| WO | 2018020778 A1 | 2/2018 |

OTHER PUBLICATIONS

Notice of Reason for Refusal for corresponding JP Application No. 2019-209139, 8 pages, dated Sep. 29, 2021.

* cited by examiner

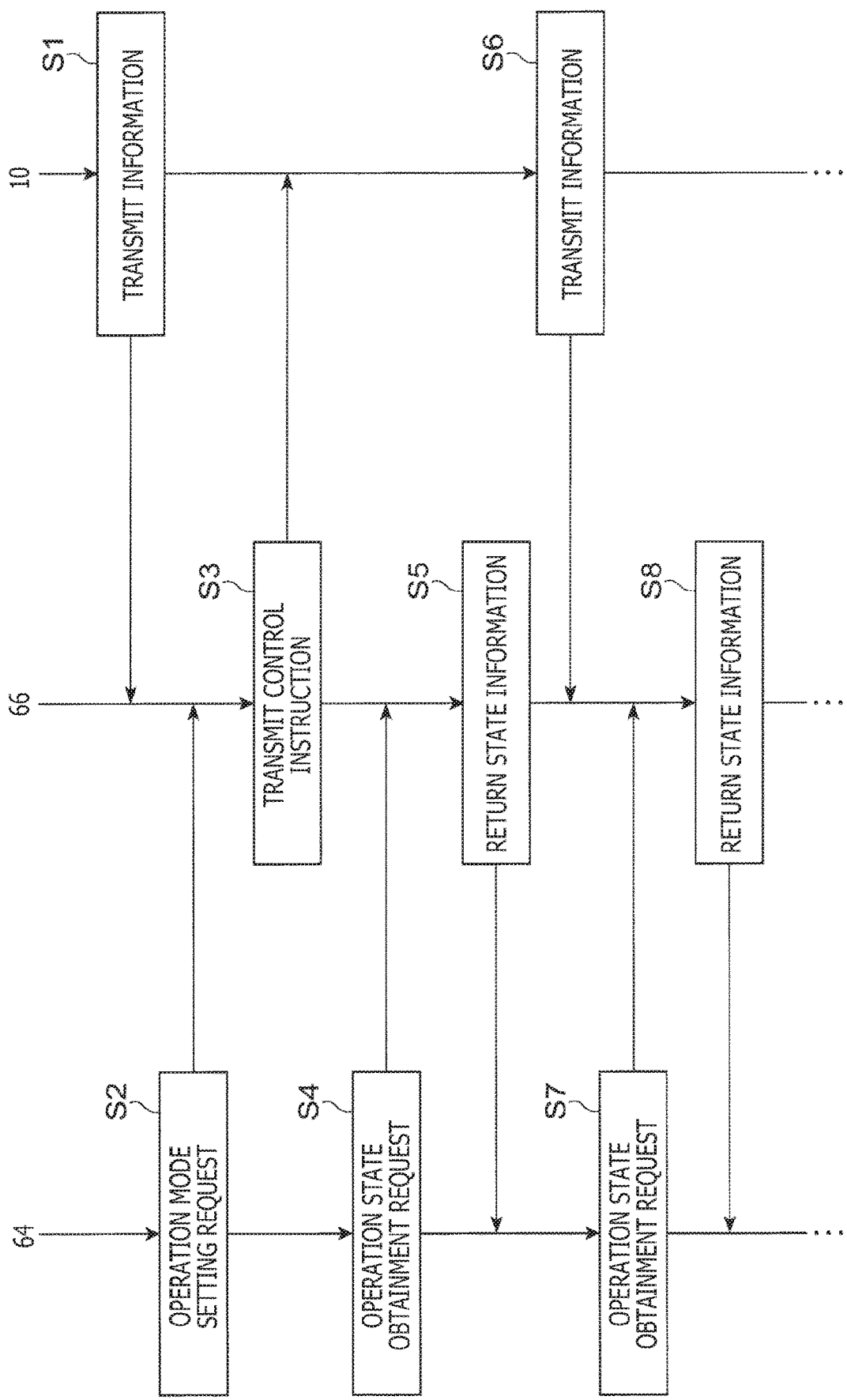

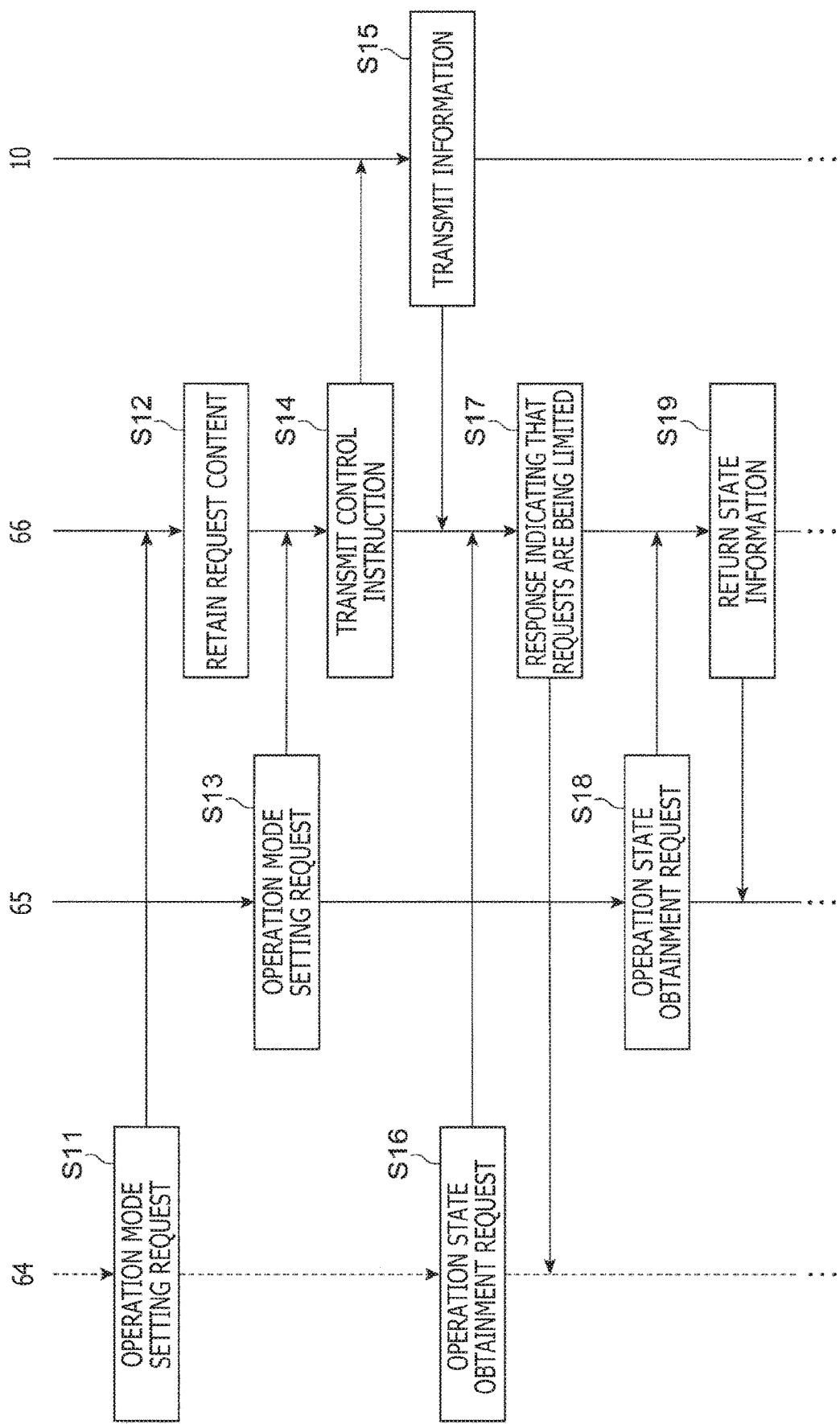

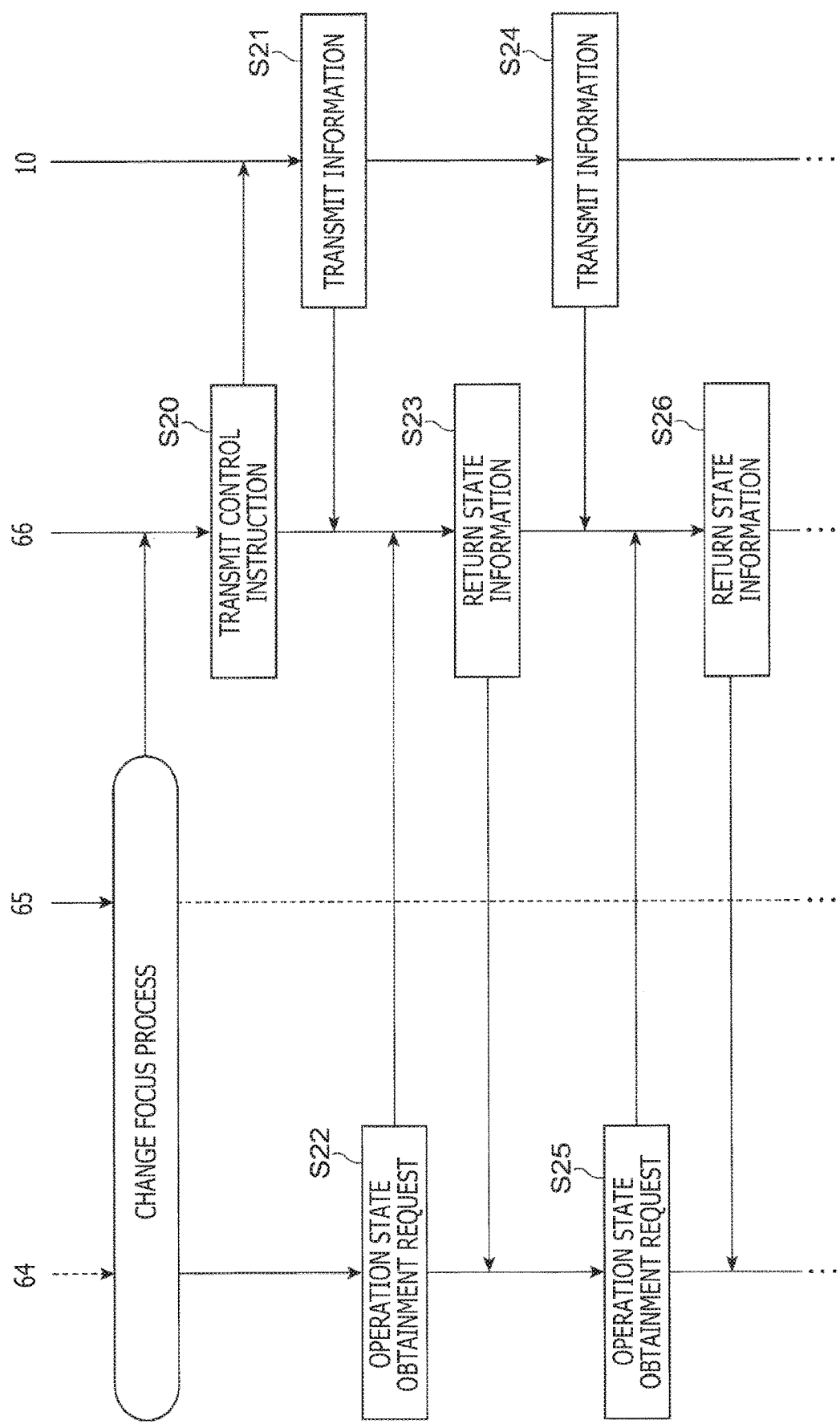

OPERATING DEVICE

CROSS REFERENCE TO RELATED APPLICATION

This application claims the benefit of Japanese Priority Patent Application JP 2019-209139 filed Nov. 19, 2019, the entire contents of which are incorporated herein by reference.

BACKGROUND

The present technology relates to an operating device that operates according to an instruction received from an information processing device.

An operating device used for operating input to an information processing device may perform various kinds of operation control for force sense presentation, vibration presentation, and the like according to an operation of a user, with an objective of giving feedback to the operation of the user and producing a scene.

SUMMARY

In the technology of the above-described example in the past, when it is difficult for the information processing device to identify a timing at which the operating device performs operation control according to an operation of the user, it is difficult for the information processing device to perform processing interlocked with the control content of the operating device. Incidentally, operation information indicating the content of operation of the user is transmitted to the information processing device. However, it may be difficult to identify the timing at which the operating device performs control according to the operation of the user, from only the operation information, due to a problem of the resolution of data or the like. In that case, a situation in which, even when the information processing device gives an instruction for reproducing sound, at a timing of receiving the operation information for which force sense presentation is to be made, from the operating device, for example, the reproduction of the sound is delayed or is conversely performed too early with respect to the force sense presentation can occur.

The present technology has been made in view of the above-described actual situation. It is desirable to provide an operating device that enables an information processing device to easily grasp a timing at which the operating device performs operation control according to an operation of a user.

An operating device according to an embodiment of the present technology is an operating device connected to an information processing device, the operating device including an information transmitting section configured to receive an operation of a user and transmit operation information indicating content of the operation to the information processing device and a control processing section configured to perform control processing determined in advance according to the operation of the user, the information transmitting section transmitting state information indicating an execution state of the control processing to the information processing device.

BRIEF DESCRIPTION OF THE DRAWINGS

FIG. 5 is a flowchart illustrating an example of a flow of processing in a case where one process is executed;

FIG. 6A is a flowchart illustrating an example of a flow of processing in a case where plural processes are executed in parallel with each other; and FIG. 6B is a flowchart illustrating an example of a flow of processing in the case where the plural processes are executed in parallel with each other.

DETAILED DESCRIPTION OF THE PREFERRED EMBODIMENT

An embodiment of the present technology will hereinafter be described in detail with reference to the drawings.

Figure 1:
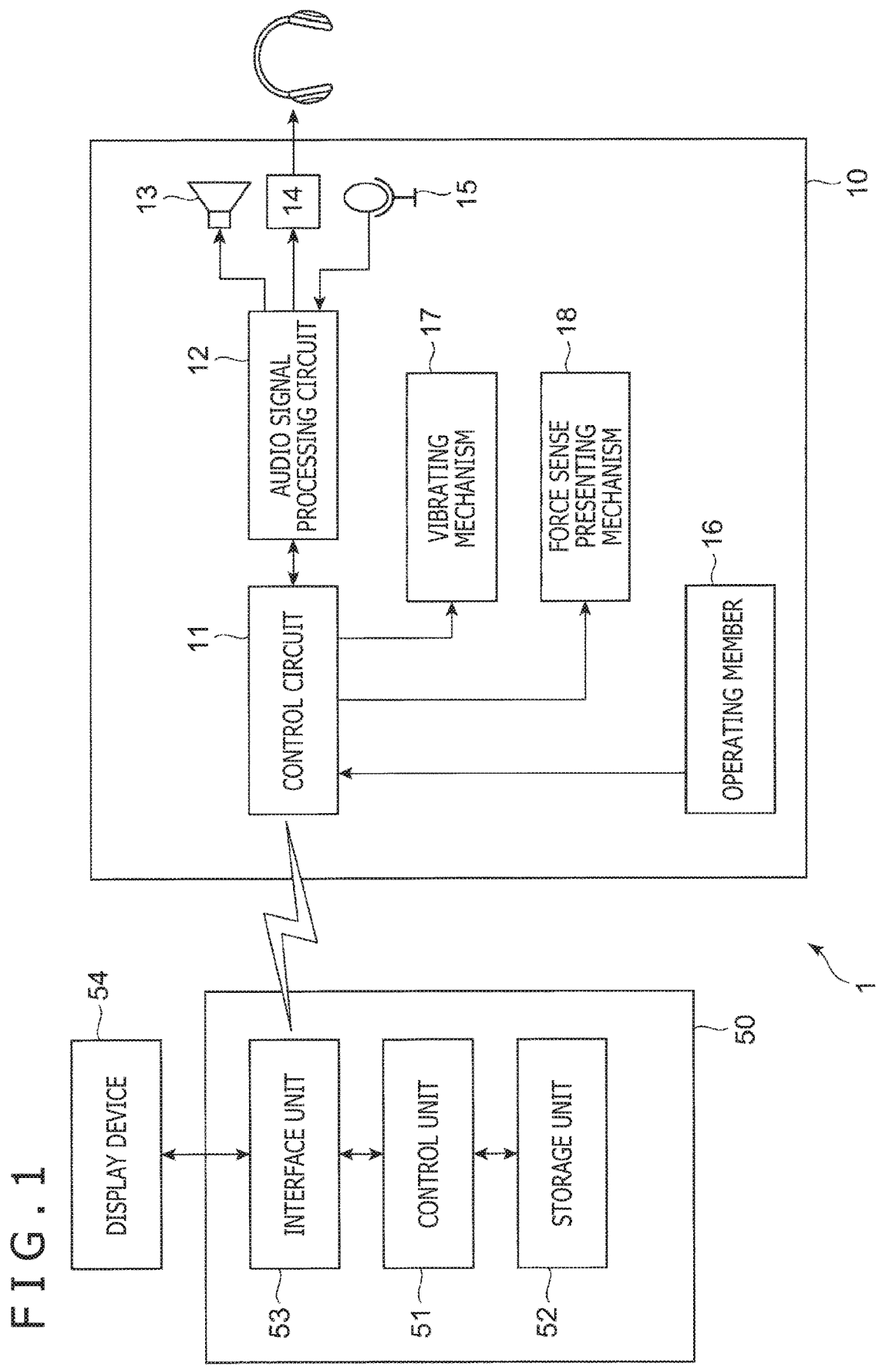
FIG. 1 is a general configuration diagram of an information processing system.
Figure 2:
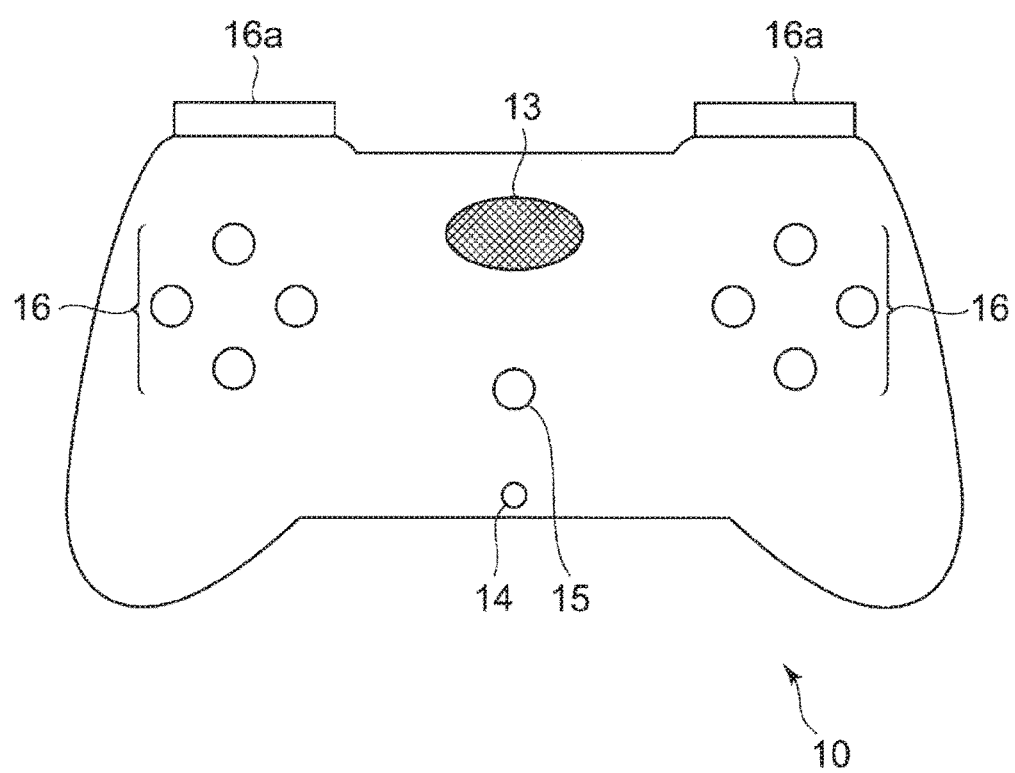
FIG. 2 is a diagram illustrating an example of an external appearance of an operating device.

FIG. 1 is a general configuration diagram of an information processing system 1 in one embodiment of the present technology. In addition, FIG. 2 is a diagram illustrating an example of an external appearance of an operating device 10. As illustrated in these figures, the information processing system 1 includes the operating device 10 and an information processing device 50. Suppose that the operating device 10 and the information processing device 50 in the present embodiment transmit and receive data by wireless communication based on a Bluetooth (registered trademark) standard or the like. Incidentally, while data transmission and reception is performed by wireless communication in this case, this is not restrictive. The operating device 10 and the information processing device 50 may be connected to each other for communication in a wired manner by using a standard such as a universal serial bus (USB), for example.

The operating device 10 is, for example, a controller for a home-use game machine or the like. The operating device 10 includes a control circuit 11, an audio signal processing circuit 12, a speaker 13, a headphone terminal 14, a microphone 15, plural operating members 16, a vibrating mechanism 17, and a force sense presenting mechanism 18.

The control circuit 11 is a microprocessor or the like. The control circuit 11 performs processing for controlling each part of the operating device 10. Specifically, the control circuit 11 outputs a control signal for operating the vibrating mechanism 17, the force sense presenting mechanism 18, or the like, according to a control instruction received from the information processing device 50. In addition, the control circuit 11 periodically scans the state of each operating member 16, identifies content of operation performed by a user, and transmits operation information indicating the content of operation to the information processing device 50.

In addition, the control circuit 11 receives an audio signal for reproduction from the information processing device 50 and transmits the audio signal for reproduction to the audio signal processing circuit 12. In addition, the control circuit 11 receives a collected sound audio signal from the audio signal processing circuit 12 and transmits the collected sound audio signal to the information processing device 50. In order to transmit and receive such various kinds of audio signals, the control circuit 11 and the audio signal processing circuit 12 are connected to each other so as to be capable of mutual data communication by an interface standard such as Inter-IC Sound (I2).

The audio signal processing circuit 12 is a digital signal processor or the like. The audio signal processing circuit 12 performs various kinds of signal processing on digital audio signals. Specifically, the audio signal processing circuit 12 sounds the audio signal for reproduction received from the control circuit 11, from headphones connected to the headphone terminal 14 or the speaker 13. In addition, the audio signal processing circuit 12 performs audio signal processing such as noise removal processing on the collected sound audio signal collected by the microphone 15 and transmits a resulting audio signal to the control circuit 11.

The speaker 13 reproduces sound based on the audio signal for reproduction which audio signal is output by the audio signal processing circuit 12. Headphones can be connected to the headphone terminal 14. In a case where the headphones are connected to the headphone terminal 14, the audio signal processing circuit 12 can also reproduce the sound based on the audio signal for reproduction from the headphones in place of the speaker 13.

The microphone 15 collects sound around the operating device 10, such as a voice uttered by the user using the operating device 10. Incidentally, the microphone 15 may be a microphone array including plural microphone elements.

The plural operating members 16 are members to which operating input by the user is performed. The plural operating members 16 may include various kinds of members. Suppose in the present embodiment that the operating members 16 include at least one trigger button 16a.

The trigger button 16a is a member operated by being depressed by the user. The trigger button 16a includes a movable portion that moves according to an operation of the user, and is able to measure an amount of depression (amount of operation) of the movable portion as a numerical value. It is thereby possible to identify, in more detail, the content of a depressing operation such as the user maintaining a state of slightly depressing the trigger button 16a or rapidly depressing the trigger button 16a all the way.

The vibrating mechanism 17 is a device that generates vibration and may be various kinds of devices such as a voice coil motor. When the vibrating mechanism 17 generates vibration according to an instruction of the control circuit 11, the vibration is transmitted to a hand of the user which hand is holding the operating device 10. Incidentally, the operating device 10 may include plural vibrating mechanisms 17. In that case, the plural vibrating mechanisms 17 may be vibrating mechanisms of kinds different from each other.

The force sense presenting mechanism 18 is a device that presents a force sense to the user when the user performs an operation on an operating member 16 or the like. In the present embodiment, the force sense presenting mechanism 18 has an arm (force sense presenting member) that comes into contact with the movable portion of the trigger button 16a. The arm applies a force to the movable portion. Thus, when the user performs an operation of depressing the trigger button 16a, the force sense presenting mechanism 18 presents a force sense to a finger that performs the operation.

Further, suppose in the present embodiment that the force sense presenting mechanism 18 can control the content of the force sense to be presented, according to the position of the movable portion of the trigger button 16a, by changing a target position of the arm according to an instruction from the control circuit 11. Specifically, the position of the arm changes according to the content of the instruction from the control circuit 11 and the force with which the finger of the user depresses the movable portion of the trigger button 16a. Suppose that the control circuit 11 changes the content of control of the arm according to the change in the position of the arm. The force sense presenting mechanism 18 can therefore change the content of the force sense to be presented to the finger of the user operating the trigger button 16a, according to the degree of the amount of operation of the trigger button 16a (that is, the amount of depression of the movable portion of the trigger button 16a). For example, the force sense presenting mechanism 18 can implement control such as presenting the force sense to the user only while the amount of operation of the trigger button 16a is included in a given value range or ending the force sense presentation performed thus far when the amount of operation of the trigger button 16a exceeds a given threshold value.

In the following, suppose that the control circuit 11 divides a control target range of the force sense presenting mechanism 18 (that is, a range in which the position of the arm can be displaced so as to be interlocked with the movable portion of the trigger button 16a) into 10 ranges P0 to P9 and that the control circuit 11 performs operation control of the force sense presenting mechanism 18 according to a range in which the position of the arm is included among these ranges. The control circuit 11 can thereby change the operation content of the force sense presenting mechanism 18 to 10 levels according to a degree to which the user depresses the trigger button 16a. Incidentally, here, the range P0 corresponds to a state in which the trigger button 16a is hardly depressed, and the range P9 corresponds to a state in which the trigger button 16a is depressed to nearly a maximum. Here, while the control target range of the force sense presenting mechanism 18 corresponds to a movable range of the movable portion of the trigger button 16a, correspondence relation between the control target ranges P0 to P9 of the force sense presenting mechanism 18 and a numerical value of the amount of operation of the trigger button 16a is not necessarily fixed due to an individual difference in positional relation between the arm of each operating device 10 and the movable portion of the trigger button 16a or the like. For example, when the amount of operation (amount of depression) of the trigger button 16a is measured at 256 levels of 0 to 255, there can occur a case where, for example, less than an operation amount 30 of the trigger button 16a in a certain operating device 10 corresponds to the control target range P0 of the force sense presenting mechanism 18, whereas less than an operation amount 32 in another operating device 10 corresponds to the range P0.

The information processing device 50 is, for example, a game machine for home use, a personal computer, or the like. The information processing device 50 includes a control unit 51, a storage unit 52, and an interface unit 53. In addition, the information processing device 50 is connected to the operating device 10 and a display device 54.

The control unit 51 includes at least one processor. The control unit 51 performs various kinds of information processing according to a program stored in the storage unit 52. The storage unit 52 includes at least one storage element. The storage unit 52 stores the program executed by the control unit 51 and data to be processed by the program. The interface unit 53 includes a communication interface for sending and receiving information to and from the operating device 10 and the display device 54. The information processing device 50 receives various kinds of information such as operation information from the operating device 10 via the interface unit 53 and transmits various kinds of control instructions to the operating device 10 via the interface unit 53. In addition, the interface unit 53 outputs a video signal to be displayed by the display device 54.

Figure 3:
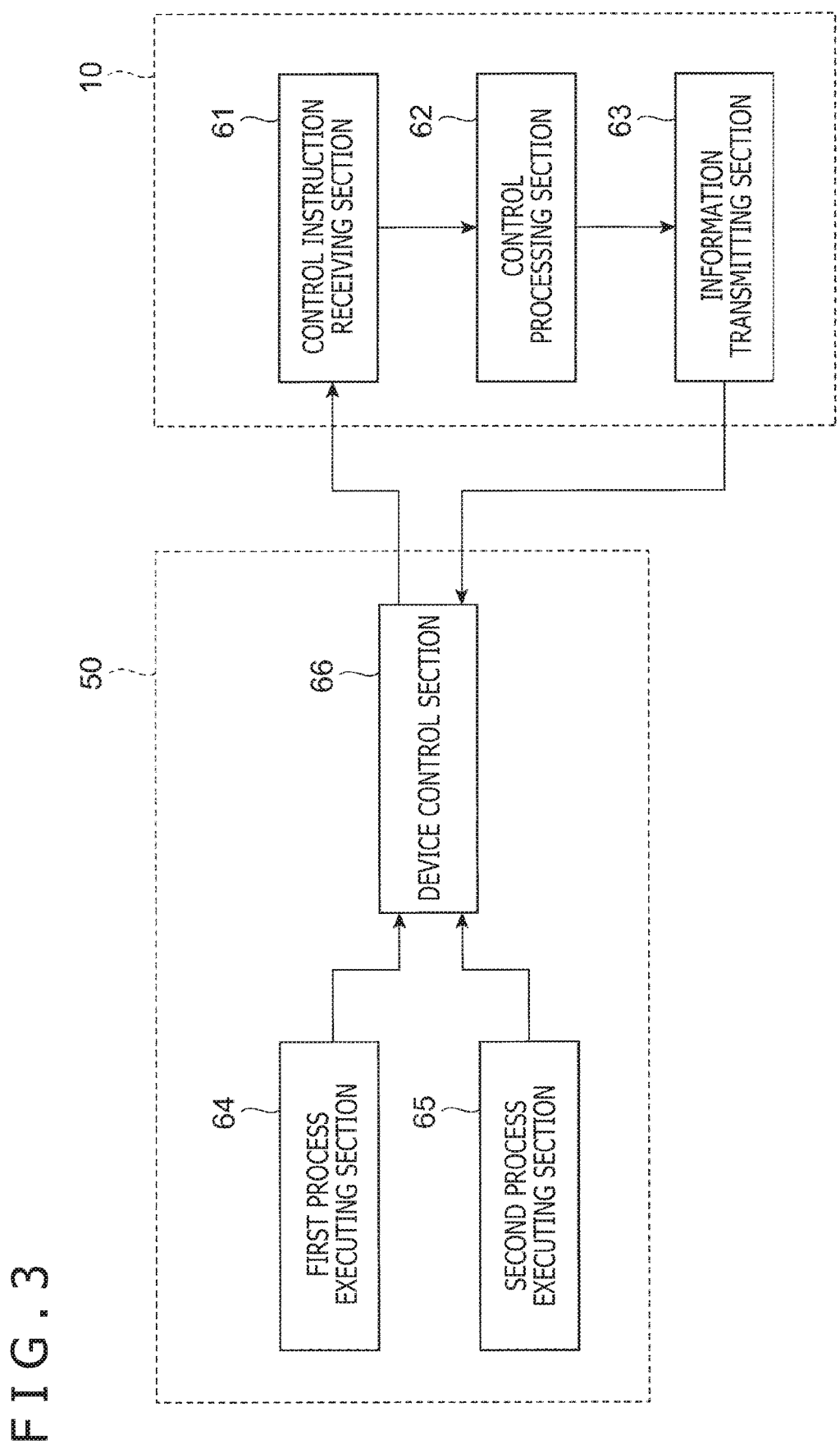
FIG. 3 is a functional block diagram illustrating functions implemented by the information processing system.

Functions implemented by the operating device 10 and the information processing device 50 in the present embodiment will be described below with reference to a functional block diagram of FIG. 3. As illustrated in FIG. 3, the operating device 10 functionally includes a control instruction receiving section 61, a control processing section 62, and an information transmitting section 63. These functions are implemented by execution of a built-in program by the control circuit 11. The information processing device 50 functionally includes a first process executing section 64, a second process executing section 65, and a device control section 66. These functions are implemented by execution of the program stored in the storage unit 52 by the control unit 51.

The control instruction receiving section 61 receives a control instruction related to the operation content of the force sense presenting mechanism 18 from the device control section 66 of the information processing device 50. Here, suppose that the control instruction received from the information processing device 50 specifies the operation condition and operation content of the force sense presenting mechanism 18. Further, suppose that the operation condition includes a condition related to a timing of operating the force sense presenting mechanism 18. That is, the control circuit 11 does not immediately make the force sense presenting mechanism 18 perform an actual operation corresponding to the content of the control instruction when receiving the control instruction from the information processing device 50 but makes the force sense presenting mechanism 18 perform the operation of the specified content at a timing at which the operation content of the user satisfies the specified operation condition, as will be described later. Incidentally, suppose that, in a case where the operating device 10 has plural trigger buttons 16a and force sense presenting mechanisms 18 are connected to the respective trigger buttons 16a, the control instruction receiving section 61 receives a control instruction for each of the force sense presenting mechanisms 18.

The control processing section 62 performs processing corresponding to the control instruction received by the control instruction receiving section 61. Specifically, the control processing section 62 monitors the content of operation on the operating members 16 by the user, and when determining that the content of operation satisfies the specified operation condition, the control processing section 62 performs control processing of operating the force sense presenting mechanism 18 on the basis of the specified operation content.

In particular, suppose, in the present embodiment, that the control instruction specifies one of plural operation modes determined in advance. When the control instruction is received, the control processing section 62 switches to an operation mode specified by the control instruction. The control processing section 62 thereafter performs control based on the operation mode until an instruction for switching to another operation mode is given. This operation mode defines the operation content to be performed by the force sense presenting mechanism 18. That is, suppose that, for each of the plural operation modes, operation content to be performed by the force sense presenting mechanism 18 in the operation mode is defined in advance and recorded in the control circuit 11.

Further, suppose that the control processing section 62 makes the force sense presenting mechanism 18 operate in one operation state determined according to a change in the operation content of the user among plural operation states determined in advance so as to correspond to each operation mode. That is, the force sense presenting mechanism 18 operates in one of the plural operation states in each operation mode, and the control processing section 62 performs control that causes the force sense presenting mechanism 18 to make a transition between the plural operation states. The control processing section 62 at least changes the operation state of the force sense presenting mechanism 18 according to the operation amount of operation performed on the trigger button 16a by the user. That is, a timing at which the operation state is to be changed is determined according to the content of the operation on the trigger button 16a by the user.

A concrete example of the operation modes will be described below. As an example, the control processing section 62 makes the force sense presenting mechanism 18 operate in a feedback mode. In this operation mode, the control processing section 62 presents a force sense repelling a depressing operation of the user while the position of the movable portion of the trigger button 16a is included in a predetermined region (that is, while the position of the arm is included in a range specified in advance among the control target ranges P0 to P9). While the position of the trigger button 16a is not included in the predetermined region, on the other hand, the control processing section 62 does not present force sense. That is, in this operation mode, the control processing section 62 makes a state transition between a state of presenting the repelling force and a state of not presenting the repelling force, according to the amount of depression of the trigger button 16a.

Incidentally, while it is assumed here that a transition is made between only two kinds of states, the control processing section 62 may, for example, change the operation state of the force sense presenting mechanism 18 to a state of presenting a strong force sense, a state of presenting a weak force sense, or the like according to the control target range of the force sense presenting mechanism 18. It is thereby possible to perform control in such a manner that, for example, no force sense is presented at a point of time at which the user starts to operate the trigger button 16a, but a repelling force that becomes stronger stepwise is presented as the depressing operation is continued. In this case, the control processing section 62 changes the operation state of the force sense presenting mechanism 18 between three or more kinds of states.

As another example, the control processing section 62 may make the force sense presenting mechanism 18 operate in a vibration mode. In this operation mode, the force sense presenting mechanism 18 presents vibration to a finger of the operating user by vibrating the arm and transmitting the vibration to the movable portion of the trigger button 16a in contact with the arm. Also in the present example, as in the feedback mode, a state transition is made between a state of presenting the vibration and a state of not presenting the vibration according to the amount of depression of the trigger button 16a. In addition, also in the present example, as in the feedback mode, a transition may be made between three or more kinds of states such as a state of presenting a strong vibration and a state of presenting a weak vibration, in addition to the state of not presenting the vibration.

Figure 4:
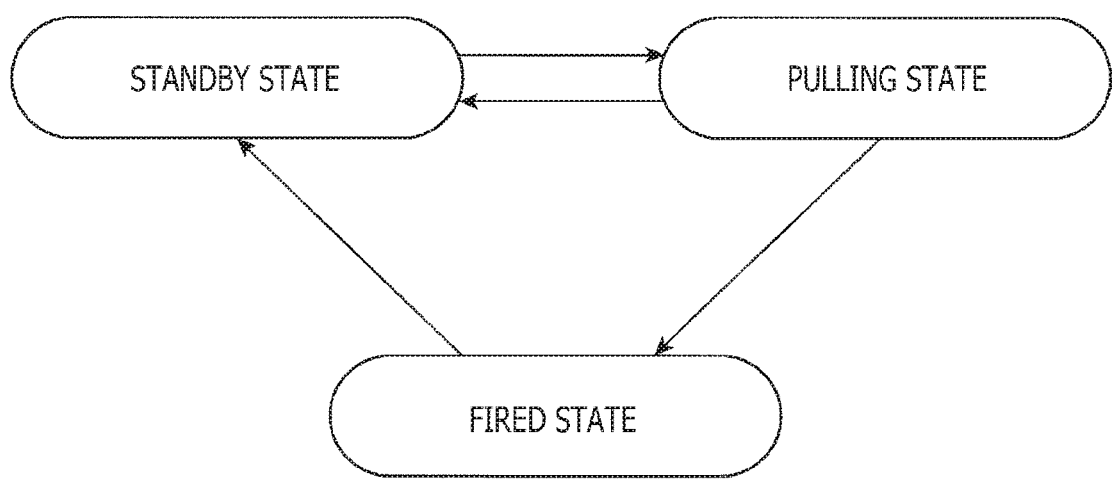
FIG. 4 is a diagram illustrating an example of state transitions in an operation mode.

In addition, the control processing section 62 may make the force sense presenting mechanism 18 operate in a trigger mode. The trigger mode is a mode for simulating operations on a trigger of a gun or the like and is an operation mode in which transitions are made between three kinds of states, that is, a standby state, a pulling state, and a fired state, as illustrated in FIG. 4. In the trigger mode, a next operation state is determined not only on the mere basis of the degree of a present amount of operation on the trigger button 16a but also according to a present operation state.

Specifically, while the trigger button 16a is not operated, or the amount of depression remains small after a start of operation (for example, when the position of the arm is in the control target range P0), the standby state is set, and the force sense presenting mechanism 18 does not operate in this state. This state corresponds to a state of pulling an allowance part of the trigger.

When the amount of operation of the trigger button 16a exceeds a certain threshold value in the standby state, the control processing section 62 makes a transition to the pulling state. This state corresponds to a state in which the trigger of the gun is gradually pulled. For example, the control processing section 62 makes a transition to the pulling state when the position of the arm is in the control target ranges P1 to P5. In the pulling state, the force sense presenting mechanism 18 presents a force sense in a direction opposing the depressing operation of the user. The user can thereby have a heavy feeling as if the user were pulling an actual trigger.

When the user further continues the depressing operation of the trigger button 16a from the pulling state and the position of the movable portion exceeds a certain threshold value, the control processing section 62 makes a transition to the fired state. This state corresponds to a state in which the trigger of the gun is pulled fully and a bullet is fired. For example, the control processing section 62 makes a transition to the fired state when the position of the arm moves to a position included in the control target ranges P6 to P9 in the pulling state. Also in this state, as in the standby state, the force sense presenting mechanism 18 does not present a force sense, so that the user can operate the trigger button 16a without feeling a resistance. Incidentally, once a transition is made to the fired state, the fired state remains even when the user eases the depressing operation and the arm moves to a position included in the control target ranges P0 to P5. It is thereby possible to reproduce a state in which the resistance of the trigger disappears after the bullet is fired. Incidentally, suppose that the control processing section 62 makes a transition from the fired state to the standby state when a given condition is satisfied in the fired state, for example, when the user separates the finger from the trigger button 16a and the state of an operation amount zero is reached. This allows the user to perform an operation of pulling the trigger of the gun again.

In this trigger mode, content of control of the force sense presenting mechanism 18 changes according to not only the present position of the movable portion of the trigger button 16a but also a state from which a transition is made. For example, even when the position of the arm is in the control target range P4, a force sense is presented in the pulling state, but no force sense is presented in the state after a transition is once made to the fired state. Therefore, when the amount of operation (amount of depression) of the trigger button 16a is simply notified from the operating device 10 to the information processing device 50, it may be difficult for the information processing device 50 to grasp in which state the operation control is currently being performed.

In addition, while the operation control of the force sense presenting mechanism 18 is performed so as to be interlocked with the position of the movable portion of the trigger button 16a, correspondence relation between a detection value of the amount of operation of the trigger button 16a and the control target range of the arm position of the force sense presenting mechanism 18 varies according to the individual difference of the operating device 10, as described earlier. From such a factor, it may be difficult to precisely identify when a state transition is made on the basis of only the value of the amount of operation of the trigger button 16a which value is notified to the information processing device 50. Accordingly, suppose that the information transmitting section 63 of the operating device 10 in the present embodiment periodically transmits state information indicating the present operation mode and the present operation state of the force sense presenting mechanism 18 to the information processing device 50.

Specifically, the information transmitting section 63 transmits operation information indicating the content of operation on the plural operating members 16 by the user (for example, which operating button is pressed and the degree of the present amount of depression of the trigger button 16a) at predetermined time intervals. Together with this operation information, state information indicating the state in which the control of the force sense presenting mechanism 18 is currently being performed among the plural operation states is transmitted to the information processing device 50. Incidentally, in the case where the operating device 10 includes plural force sense presenting mechanisms 18, state information indicating the present operation state of each of the force sense presenting mechanisms 18 is transmitted. It is thereby possible to clearly notify the information processing device 50 of the operation state of the force sense presenting mechanism 18 which operation state is difficult to identify on the basis of only the measured value of the amount of operation of the trigger button 16a.

Incidentally, while it is assumed here that the information transmitting section 63 transmits the state information together with the operation information, this is not restrictive. The information transmitting section 63 may transmit the state information at a timing different from that of the operation information. In addition, the information transmitting section 63 may transmit the state information at a frequency different from the transmission frequency of the operation information. Further, the information transmitting section 63 may also transmit control position information indicating not only the present operation state but also the arm position (position at which the arm is present in the plural control target ranges, for example) as the state information of the force sense presenting mechanism 18. This control position information indicates the present position at which the control processing section 62 is performing force sense presentation control.

As will be described later, the application program being executed in the information processing device 50 obtains this operation information and performs various kinds of processing according to the content of the operation information. This processing may include processing of outputting a control instruction to operate the vibrating mechanism 17, processing of outputting an audio signal for reproduction, and the like. It is thereby possible to implement control interlocked with the operation state of the force sense presenting mechanism 18 by, for example, reproducing sound from the speaker 13 and making the vibrating mechanism 17 present vibration at a timing at which a transition is made from the pulling state to the fired state in the trigger mode.

The first process executing section 64 and the second process executing section 65 of the information processing device 50 perform various kinds of information processing according to the content of operating input from the user or the like by executing respective independent processes.

Suppose in the following that, as a concrete example, the first process executing section 64 is implemented by executing an application program such as a game, and the second process executing section 65 is implemented by executing a system program. In the following, the process implemented by the first process executing section 64 will be described as a first process, and the process implemented by the second process executing section 65 will be described as a second process.

These processes are executed independently of each other. That is, the first process and the second process may be executed in parallel with each other at the same timing, and a state in which both of the processes are being executed is permitted. In addition, one of the processes is selectively selected as a focus process on the basis of a given condition. Suppose here that the focus process is a process subject to operation by the user and that the operation information transmitted from the operating device 10 is obtained and processed by the focus process.

The switching of the focus process is performed under various conditions. As one example, when the user operates a system button provided to the operating device 10 while the first process executing section 64 is executing a game program, the second process executing section 65 starts a system program and displays a system screen for presenting a result of processing of the system program on the display device 54, and the focus process is changed from the first process to the second process. When an instruction to end the system screen is thereafter given, the focus process is changed from the second process to the first process. Incidentally, while the second process is selected as the focus process, the first process operates in the background and continues performing various kinds of processing related to the game.

Under such conditions, the device control section 66 transmits a control instruction for operating the operating device 10 according to a request from each process and makes appropriate adjustments according to the changing of the focus process. Content of control performed by the device control section 66 will be described in detail below.

First, an example of a flow of processing in a case where only the first process is being executed will be described with reference to a flowchart of FIG. 5. As described earlier, the information transmitting section 63 of the operating device 10 periodically transmits the operation information and the state information to the information processing device 50. In this figure, the transmission of the operation information and the state information at a certain point of time is indicated by S1.

The first process executing section 64 thereafter outputs a request for setting an operation mode of the force sense presenting mechanism 18 to the device control section 66 (S2). Suppose here that, as an example, the first process executing section 64 requests the operation mode to be changed to the trigger mode because the user has become able to perform an operation of shooting a gun in the game. In response to this request, the device control section 66 transmits a control instruction for setting the operation mode to the trigger mode to the operating device 10 (S3). Receiving this control instruction, the control processing section 62 of the operating device 10 changes the operation mode to the trigger mode. However, as described earlier, information transmission from the operating device 10 to the information processing device 50 is performed periodically. Therefore, the state information in the new operation mode is not transmitted to the information processing device 50 immediately after the operation mode has changed. In the present example, the first process executing section 64 makes an operation state obtainment request to the device control section 66 before the state information in the new operation mode is transmitted from the operating device 10 (S4). At this stage, the device control section 66 has not obtained the state information in the new operation mode. The device control section 66 therefore returns, as a response to the obtainment request in S4, the most recent state information transmitted in S1 (S5).

The information transmitting section 63 of the operating device 10 thereafter transmits new operation information and new state information in S6 (S6). Here, the state information in the new operation mode designated in S3 (for example, information indicating the standby state in the trigger mode) is transmitted. When the first process executing section 64 thereafter makes an operation state obtainment request again (S7), the device control section 66 returns the state information in the trigger mode which state information is transmitted in S6 (S8).

Thus, the first process executing section 64 outputs an operation mode setting request to the device control section 66 in association with the progress of processing and is thereafter able to grasp a transition of the operation state performed by the operating device 10, by obtaining the state information periodically transmitted from the operating device 10. Incidentally, suppose that, when audio reproduction or the like is to be controlled so as to be interlocked with a state transition, the first process executing section 64 makes an inquiry repeatedly in such short cycles as to enable such control.

Next, an example of a flow of processing in a case where the first process and the second process are executed in parallel with each other will be described with reference to a flowchart of FIG. 6A and FIG. 6B. Suppose that, in the present example, the second process is the focus process at first. Incidentally, in FIG. 6A and FIG. 6B, of the first process executing section 64 and the second process executing section 65, an executing section that is executing the focus process is indicated by a solid line, and an executing section that is executing the other process is indicated by a broken line.

In the present example, first, the first process executing section 64 outputs an operation mode setting request (S11). As described earlier, a process (first process in this case) other than the focus process is also being executed. An operation mode setting request may therefore be output according to conditions of progress of processing of the other process. However, at this point of time, the second process is the focus process, and there is thus a fear of causing confusion to the user when the operating device 10 performs an operation according to the processing content of the first process. Accordingly, the device control section 66 ignores an operation mode setting request from the process other than the focus process and limits an operation mode changing control instruction to the operating device 10 at this stage. However, suppose that, in preparation for a case where the first process later becomes the focus process, the device control section 66 temporarily retains the content of the setting request output by the first process executing section 64 (S12).

Suppose that the second process executing section 65 subsequently outputs an operation mode setting request this time (S13). At this point of time, the second process is the focus process, and therefore, the device control section 66 transmits a control instruction for changing the operation mode to the operating device 10 in response to the setting request (S14). At a subsequent timing, periodic information transmission from the operating device 10 is performed (S15).

Suppose that the first process executing section 64 further outputs a state information obtainment request following the setting request in S11 (S16). At this time, the operation mode is not changed according to the setting request in S11, and the first process is not the focus process. The device control section 66 therefore makes a response to the effect that the obtainment request from the first process is limited (S17).

When the second process executing section 65 outputs a state information obtainment request (S18), on the other hand, the second process is the focus process, and therefore the device control section 66 returns the state information transmitted in S15 to the second process executing section 65 in response to this obtainment request (S19).

Suppose that the user thereafter performs an operation of ending the system screen, for example, and that the focus process is thus changed from the second process to the first process. In response to the changing of the focus process, the device control section 66 transmits, to the operating device 10, a control instruction corresponding to the setting request received most recently from the focus process after the change and retained (setting request whose content is retained in S12 in this case) (S20). Such control can change the operation mode according to the request of the first process without the first process executing section 64 outputting the operation mode setting request again. Incidentally, in a case where, at the time of the changing of the focus process, there is no operation mode setting request received in the past from the focus process after the change, the device control section 66 may transmit a control instruction for resetting the present operation mode to the operating device 10.

In the present example, information is transmitted from the operating device 10 immediately after the transmission of the control instruction in S20 (S21). At this point of time, the changing of the operation mode according to the control instruction in S20 is not completed, and state information corresponding to the operation mode thus far is transmitted. When the first process executing section 64 outputs a state information obtainment request in this state (S22), the first process is selected as the focus process this time, and therefore, the state information transmitted in S21 is provided to the first process (S23). Further, the operation mode is changed according to the control instruction transmitted in S20, and state information in the operation mode after the change is transmitted to the device control section 66 (S24). Thereafter, in response to a state information obtainment request from the first process executing section 64 (S25), the state information in the operation mode requested by the first process executing section 64 in S11 is returned (S26).

As described above, in a case where the information processing device 50 executes plural processes and one of the plural processes is selectively selected as the focus process, the device control section 66 outputs a control instruction for changing the operation mode in response to a request received from the focus process. It is thereby possible to avoid performing operation control of the force sense presenting mechanism 18 based on a request from a process other than the focus process to which the user is to currently perform operating input. Further, the device control section 66 temporarily retains, in advance, the content of an operation mode setting request received from the process other than the focus process and transmits a control instruction corresponding to the retained content of the setting request when the process is selected as the focus process. Each process can therefore make an operation mode setting request regardless of whether the process itself is currently the focus process.

As described above, according to the present embodiment, the information processing device 50 can suitably perform control according to the execution state of the operating device 10 or the like.

It is to be noted that embodiments of the present technology are not limited to that described above. For example, the operating device 10 is assumed to be a controller of a game machine for home use in the above description. However, this is not restrictive. The operating device 10 may be various kinds of devices that receive user operations.

In addition, in the above description, it is assumed that the control processing section 62 changes the operation state of the force sense presenting mechanism 18 according to the amount of operation on the trigger button 16a by the user. However, this is not restrictive. The control processing section 62 may control the operation content of the force sense presenting mechanism 18 according to the content of operation on various operating members by the user. In addition, the control processing section 62 may not only perform the operation control of the force sense presenting mechanism 18 but may also control the operation content of various kinds of mechanisms such as the vibrating mechanism 17 according to user operation on the operating members provided to the operating device 10, for example. In either case, when the information transmitting section 63 periodically transmits state information indicating control that is currently being performed on each mechanism to the information processing device 50, the information processing device 50 can perform processing corresponding to the control state of the operating device 10 at an appropriate timing.

It should be understood by those skilled in the art that various modifications, combinations, sub-combinations and alterations may occur depending on design requirements and other factors insofar as they are within the scope of the appended claims or the equivalents thereof.

What is claimed is:
1. An operating device connected to an information processing device, the operating device comprising:
an information transmitting section configured to receive a current operation position value of an operating member of the operating device and transmit operation information indicating the current operation position value to the information processing device, the current operation position value being one of a continuous plurality of possible operation positions of the operating member; and
a control processing section configured to perform control processing of a feedback mechanism of the operating device to place the feedback mechanism in a next control state, based on the current operation position value and a present control state of the feedback mechanism;
the information transmitting section transmitting state information indicating an execution state of the control processing to the information processing device; wherein
the feedback mechanism of the operating device presents a physical force in at least one of the control states.
2. The operating device according to claim 1, wherein the control processing section performs control processing corresponding to a control state determined accord- ing to a change in the content of the operation of the user among plural control states determined in advance, and the information transmitting section transmits state information indicating the control state corresponding to the control processing being performed among the plural control states.

3. The operating device according to claim 2, wherein the control processing section operates in an operation mode designated from the information processing device among plural operation modes determined in advance, and the plural control states are determined in advance for each of the plural operation modes.

4. The operating device according to claim 2, wherein the control processing section determines the control state according to an operation amount of operation performed on the operating member by the user.

5. The operating device according to claim 4, wherein the control processing section determines a next control state according to the operation amount and a present control state.

6. The operating device according to claim 5, wherein the operating member is a button that is capable of measuring an amount of depression of the button by the user, and the control processing section determines the next control state according to a present amount of depression of the button and the present control state.

7. The operating device according to claim 1, wherein the control processing is processing of presenting a force sense to the user.

8. The operating device according to claim 7, further comprising:

an operating member having a movable portion that moves according to the operation of the user; and a force sense presenting member configured to present a force sense to the user operating the operating member, the force sense presenting member changing in position according to a position of the movable portion;

the control processing section changing content of the force sense presented by the force sense presenting member according to a position of the force sense presenting member;

the state information including positional information indicating the position of the force sense presenting member.

* * * * *